April 14, 1970     R. L. WEHR     3,506,172

CUTTING APPARATUS

Filed Dec. 20, 1967     5 Sheets-Sheet 1

INVENTOR
ROBERT L. WEHR
Attorney 3,506,172
CUTTING APPARATUS
Robert L. Wehr, Harmony, Pa., assignor to Billco, Zelienople, Pa., a corporation of Pennsylvania
Filed Dec. 20, 1967, Ser. No. 692,182
Int. Cl. B26f 3/00; B26d 3/08
U.S. Cl. 225—96.5                              10 Claims

ABSTRACT OF THE DISCLOSURE

An apparatus is disclosed for cutting and separating a moving glass ribbon into predetermined lengths as selected from a programmer. Operation of the apparatus is controlled through a glass length measuring system and a breakout measuring system. The glass length measuring system is capable of accurately detecting glass length, and through a predetermined number of cycles, repeatedly controlling the operation of a movable bridge assembly. The bridge assembly spans the glass ribbon, and has a cutter assembly supported thereon for movement transversely of the ribbon of glass. The bridge assembly further includes a system of clamping or lock-up rolls rotatably supported thereon which in response to a control signal from the glass length measuring system are adapted to frictionally engage or freeze the bridge assembly to the ribbon to thereby effect synchronized movement of bridge with the glass. During this movement, the cutter assembly traverses the ribbon, producing a cut or score line normal to the major axis of the ribbon. At the instant cutting begins, operation of the breakout measuring system is initiated, which, after a predetermined measure, actuates a breaker roller located downstream of the bridge assembly at the precise time the score lines are superimposed over this breaker roller to effect a convex bending moment in the ribbon thus breaking and separating the predetermined lengths of glass from the ribbon.

BACKGROUND OF THE INVENTION

Field of the invention

This invention relates to apparatus for cutting a moving sheet of material or a moving continuous ribbon of material and especially relates to apparatus for automatically cutting the material transversely to its direction of travel in accordance with a program of cutting.

Description of the prior art

While the invention in its broader aspects is useful in cutting a moving sheet or a moving continuous ribbon of material for which the apparatus may be designed to cut, the description herein will be illustrated in connection with apparatus for cutting transversely a moving continuous ribbon of glass.

In the manufacture of plate glass and float glass the glass originates from the furnace or "tank" as a horizontal and continuously flowing ribbon. After subsequent treatment and processing, it enters a cutting zone, and it is at this stage that it becomes necessary to reduce this advancing ribbon of glass into small segments or plates. This reduction is accomplished by severing the ribbon transversely into predetermined lengths.

Manual cutting and handling of the glass is extremely slow and uneconomical and various schemes to automatically accomplish the cutting operation have been devised. Because the ribbon is constantly moving, in order to produce a "cut" or score line which is exactly 90° to the axis of this ribbon, it becomes necessary to synchronize the cutting with the movement of the ribbon. One of such automatic methods of cutting utilizes a diagonally guided cutter which is electrically interlocked with the advance of the glass ribbon. This causes the cutter, although traversing the ribbon diagonally, to produce a "cut" or scratch line on the glass surface which is perpendicular to the major axis of the ribbon. Other previous methods have utilized vacuum cups or felt pads which attach or clamp a movable carriage carrying the cutter to the moving ribbon, or a mechanical finger or fingers intercept the leading edge of the advancing ribbon and tow or pull the cutting carriage along while a transverse cut is being produced by the cutter. Still others utilized various tachometer or servo systems to attempt to match the speed of the carriage supporting the cutter with the speed of the ribbon.

In conjunction with such automatic cutting apparatus, there is generally employed automatic systems for breaking the "cut" ribbon. These automatic breaking systems conventionally include transverse breaker rollers mounted on a conveyor over which the scored ribbon is conveyed. The transverse breaker rollers are generally disposed to raise vertically when the transverse score lines imposed on the ribbon by the cutter pass over the breaker rollers to thereby break the glass ribbon.

Some of the difficulties or problems encountered in the prior art devices which the present invention substantially reduce, if not entirely eliminate, are that generally the prior art devices are cumbersome and time consuming to set up for cutting the ribbon into pieces of preselected size, and once set to a given size, it is difficult to change the apparatus to cut other lengths or sizes and reasonably accurate tolerances can be attained only after much trial and error. Vacuum cups or felt pads often leave marks which damage the glass surface and there is a great possibility of slippage between the glass and these attaching or clamping means which destroys accuracy. Also, differences in suction causes uneven support which introduces bending stresses in the ribbon and during the cutting or scoring of the glass surface, the glass is generally poorly supported causing premature breakage or erratic and unpredictable cut quality. Further, extraneous equipment is required to detect glass length and initiate cutting, and, generally, such equipment is not readily adaptable to control from a remote programmer or from a computer, although at least one glass cutting apparatus is disclosed in U.S. Patent 3,107,834, granted Oct. 22, 1963, which cuts the glass in accordance with a program of cutting.

SUMMARY

Briefly, the apparatus provided by the present invention combines within a very compact framework a machine having the capability to cut and separate a glass ribbon into lengths as selected from a remote programmer. The apparatus basically comprises a rigid steel frame supporting other components of the apparatus including rollers which convey the glass ribbon during cutting. The frame is accurately machined to support and guide a movable bridge assembly which spans the glass ribbon and which has a cutter assembly supported thereon for movement transversely of the ribbon of glass. A system of clamping or lock-up rolls mounted on the bridge are adapted to frictionally engage or freeze the bridge to the glass to effect synchronized movement of the bridge with the glass to permit the cutter assembly to produce a cut normal to the major axis of the ribbon. Downstream of the bridge, breaker means are supported on the frame and are arranged and operable so as to cause a convex bending movement in the glass at the time the score lines or cuts are superimposed over the breaker means.

Operation of the apparatus is effected through a programmable glass length measuring system and a breakout measuring system. The glass length measuring system is capable of accurately detecting glass length, and through a predetermined number of cycles, repeatedly controlling operation of the bridge assembly. The glass length measuring system also has the capability to switch to and begin producing a predetermined quantity of alternate length glass upon achieving said first predetermined number of cycles or count thereby avoiding costly and time consuming delays for changing the set-up of the machine to cut different lengths or sizes.

The breakout measuring system is capable of accurately determining location of the cut or score line downstream of the bridge assembly and at about the instant cutting begins, its operation is initiated, and after a predetermined measure, repeatedly actuates the breaker means at the precise time the cuts are superimposed over the breaker means to effect a convex bending moment in the glass to break and separate the predetermined lengths of glass from the ribbon.

The system of clamping or lock-up rolls are mounted to each side of the movable bridge by means of precision ball bearings and comprise a pair of rubber covered rolls, one being positioned above and one being below the pass line of the glass. Mounted on the ends of each lock-up roll is an electric brake which, through over excitation, can arrest rotation of these rolls almost instantaneously. The gap between these rolls is adjustable and is preferably adjusted to less than the glass thickness passing therethrough. With the gap so adjusted, the lock-up rolls rotate freely as the glass passes between them but when arrested by the brakes, a great amount of friction is developed between the glass ribbon surfaces and the surfaces of these rolls, thereby reducing slippage during attachment of the bridge assembly to the ribbon and thus assuring accuracy in the length of ribbon cut. Also, the lock-up rolls venly support the ribbon across its width thereby eliminating bending stresses sometimes introduced into the ribbon by the use of vacuum cups.

Upon receiving a signal from the glass length measuring system, the brakes arrest rotation of the lock-up rolls which, as stated above, effectively freezes the bridge assembly to the glass ribbon.

The advancing ribbon then carries the bridge assembly with it along the frame and downstream of its home position, during which time the cutter assembly is caused to move across the glass and cut the glass in its travel. The inertia of the bridge assembly is substantially offset by a pneumatic cylinder, which is attached to the bridge assembly and the frame, and whose pressure is adjusted to a level just below that required to actually advance the bridge. This anti-inertia action also reduces slippage and substantially eliminates possible buckling of the ribbon, especially so when the ribbon of glass being cut is relatively thin or of light gauge. The same pneumatic cylinder at a higher pressure is used to return the bridge assembly after completion of a cutting cycle to its home position.

The present invention further provides a cutter roller mounted on the bridge assembly directly beneath the cutter assembly having its outer periphery tangent to the pass line and therefore supporting the glass at the cut. This arrangement is especially advantageous when cutting thin glass or hard glass which may otherwise flex under cutting pressure, thus causing poor cuts or premature breakage.

A more complete understanding of the invention may be had from the following detailed description of a preferred embodiment thereof when read in conjunction with the appended drawings.

DESCRIPTION OF THE PREFERRED EMBODIMENTS

The present invention may be considered a component of an over-all or complete system for continuously handling glass in a modern plate or float glass factory. In such factories the glass originates from the glass making furnace as a horizontal and continuously flowing ribbon. After subsequent treatment and processing, the ribbon is conveyed to cutting apparatus where the ribbon is reduced into small segments or plates which are then transported and distributed to other areas in the factory for further handling.

In the following description, a general outline of the cutting apparatus and its mode of operation will be presented first and this will be followed by a more detailed dscribtion. Also, all references to the right hand sides and the left hand sides of the various parts are to be understood as those sides which a viewer would see looking downstream unless otherwise stated.

In the preferred embodiment, the glass cutting apparatus for cutting a ribbon of glass into predetermined lengths is shown generally at 10 and basically comprises an accurately machined rigid steel frame 12 supporting other components of the apparatus including conveyor rollers 14, the first of which receives the leading edge 16 of a ribbon of glass 17 from an upstream conveyor (not shown) and advances the ribbon in a rectilinear path downstream through the remainder of the cutting apparatus 10.

The frame 12 supports a movable bridge assembly shown generally at 18 which spans the ribbon and which has a cutter assembly 20 movably supported thereon. The bridge assembly 18 includes wheels 22 adapted to ride on circular rails 24 which are mounted on the frame 12. By reason of its construction, the bridge 18 is movable along the rails 24 in a rectilinear path parallel to the path of movement of the ribbon. To effect such movement of the bridge 18, a pair of spaced confronting lock-up rolls 26 and 28 are mounted thereon and define between them a pass line through which the ribbon travels with the upper roll 28 being in rolling contact with the upper surface of the ribbon and with the lower roll 26 being in rolling contact with the lower surface of the ribbon. The rolls 26 and 28 have brakes 30 and 32, respectively, connected thereto to arrest rotation of the rolls. The arrangement is such that the rolls 26, 28 rotate freely as the ribbon passes between them, but when arrested by their respective brakes, the rolls frictionally engage and clamp the rolls to the ribbon because of the friction developed between the ribbon surfaces and the surfaces of the rolls. The ribbon then moves the bridge with it along its path of movement. The intertia of the bridge 18 is substantially offset by a pneumatically operated cylinder 34, which is connected to the bridge assembly 18 and the frame 12, at 35 and 37, respectively, and whose pressure is adjusted to a level just below that required to actually advance the bridge 18. During travel of the bridge with the ribbon, the cutter assembly 20 is caused to move across the bridge transversely of the ribbon and normal to the ribbon's major axis scoring the glass as it moves. The transverse movement of the cutter assembly 20 is effected by pneumatically operated cable cylinder 36 which is also supported on the bridge assembly 18. After completion of a scoring cycle, cylinder 34 is operable to return the bridge 18 to its home position.

Figure 1:
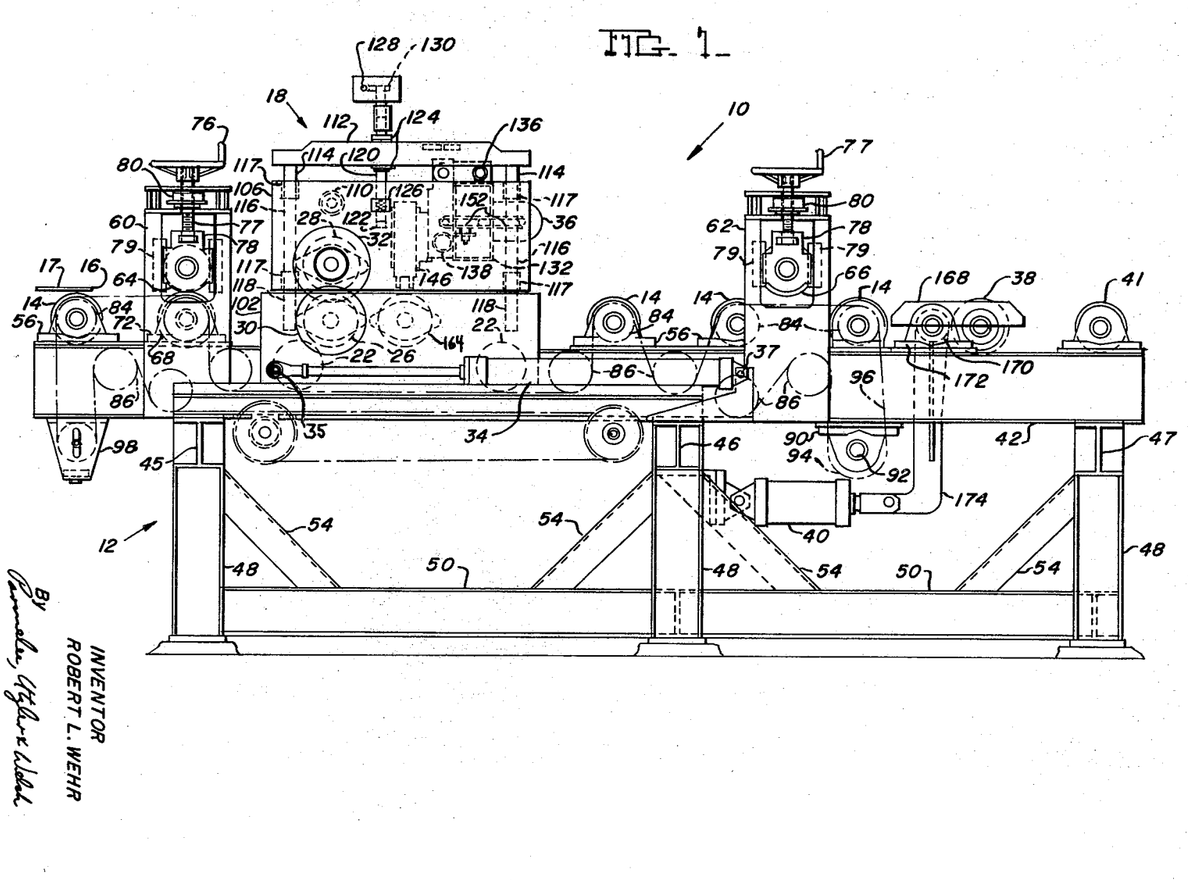
FIGURE 1 is an elevation of apparatus according to the present invention.

Downstream of the bridge 18, a breaker or snapper roller 38 is supported on the frame 12 and is arranged and operable by actuation of a pneumatic cylinder 40 supported on the frame 12 so as to cause a convex bending movement in the ribbon at the time the score lines are superimposed over the snapper roller 38 thus breaking and separating the predetermined lengths of glass from the ribbon. Another conveyor, the first roller of which is shown at 41, receives the cut and separated lengths of glass and conveys them to other areas for further handling.

Referring now in more detail to the drawings, the frame 12 is constructed mainly of I-beam members including a pair of horizontal, transversely spaced members 42 and 44 mounted atop a series of horizontal, longitudinally spaced members 45, 46 and 47. The members 45, 46, and 47 are in turn supported by vertical, longitudinally spaced members 48. Bracing is provided to the frame 12 by longitudinal beam members 50, transverse members 52 and angularly disposed T-beam members 54.

Each of the conveyor rollers 14 has a neck portion 55 and each neck portion is rotatably mounted in a pillow block 56 affixed to the members 42 and 44. Each of the rollers 14 is surrounded by a rubber sleeve 58, in order to assure positive traction between the rollers and the glass ribbon surface.

Rigidly secured to the outside surfaces of beam members 42 and 44 are two pairs of pinch roll brackets 60, 61 and 62, 63. The pair 60, 61 is positioned upstream and the pair 62, 63 is positioned downstream of the bridge 18. The pairs of brackets 60, 61 and 62, 63 adjustably and rotatably support pinch rolls 64, 66 respectively. Spaced from and directly beneath the upper pinch roll 64 is a cooperating lower pinch roll 68. The lower pinch roll 68 is rotatably mounted in pillow blocks 72 and 74, which are affixed to members 42 and 44. Adjustment of the gap between the upper and lower pinch rolls 64 and 68 to provide for different gauges of ribbon passing between these rolls is effected by rotation of a hand wheel 76. Another similar hand wheel 77 is associated with bracket 62 to provide for adjustment of pinch roll 66 relative to the ribbon. Each hand wheel 76, 77 has associated therewith a screw shaft 77, and each screw shaft is screwed into a take-up bearing assembly 78 provided in each of the pinch roll brackets. The bearing assemblies 78 are movable upwardly and downwardly within the brackets and are guided in slots 79 provided in each of the brackets. To assure equal movement of the bearing assemblies 78 and corresponding equal adjustment of the opposite ends of the respective rolls 64 and 66, a sprocket 80 is non-rotatably secured to each screw shaft and a suitable chain or belt (not shown) interconnects the sprockets above roll 64 and another chain or belt interconnects the sprockets above roll 66.

The lower pinch roll 68 also acts as a conveyor roller and the upper pinch roll 64 also acts as a count roll as will be explained hereinafter. Further each of the pinch rolls is surrounded by a rubber sleeve 82 similar to that surrounding the conveyor rollers 14.

In order to effect rotation of the conveyor rollers and the lower pinch roll 68 and thereby advance the ribbon 17 through the apparatus 10, each of the conveyor rollers and the lower pinch roll has mounted on their neck portions a driven sprocket 84. In alignment with the sprockets 84 and rotatably mounted on the inside surface of the I-beam member 42 are a series of idler sprockets 86. And, rotatably mounted on the undersurfaces of beam members 42 and 44 by means of pillow blocks 90 is a transverse drive shaft 92 having a driving sprocket 94 non-rotatably mounted thereon. An endless chain 96 is passed over and under the various sprockets as shown. A drive means (not shown) is coupled to the drive shaft 92 and operation of the drive means effects rotation of the driving sprocket 94 and the various driven and idler sprockets. A chain take-up bracket 98 is provided on the frame to adjust the tension in the chain 96.

Figure 2:
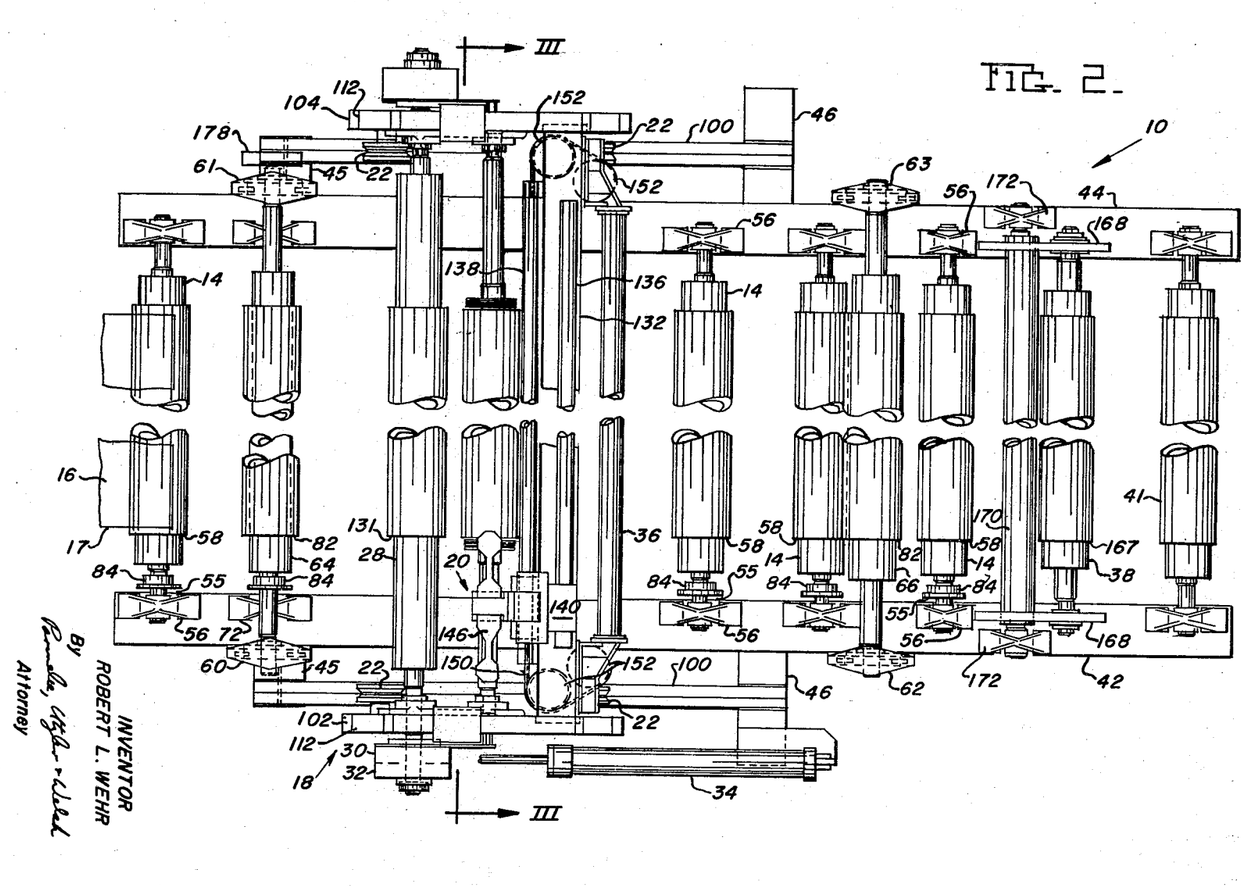
FIGURE 2 is a plan view of the apparatus shown in FIGURE 1 with some parts removed for the purpose of more clearly illustrating other parts of the apparatus.
Figure 3:
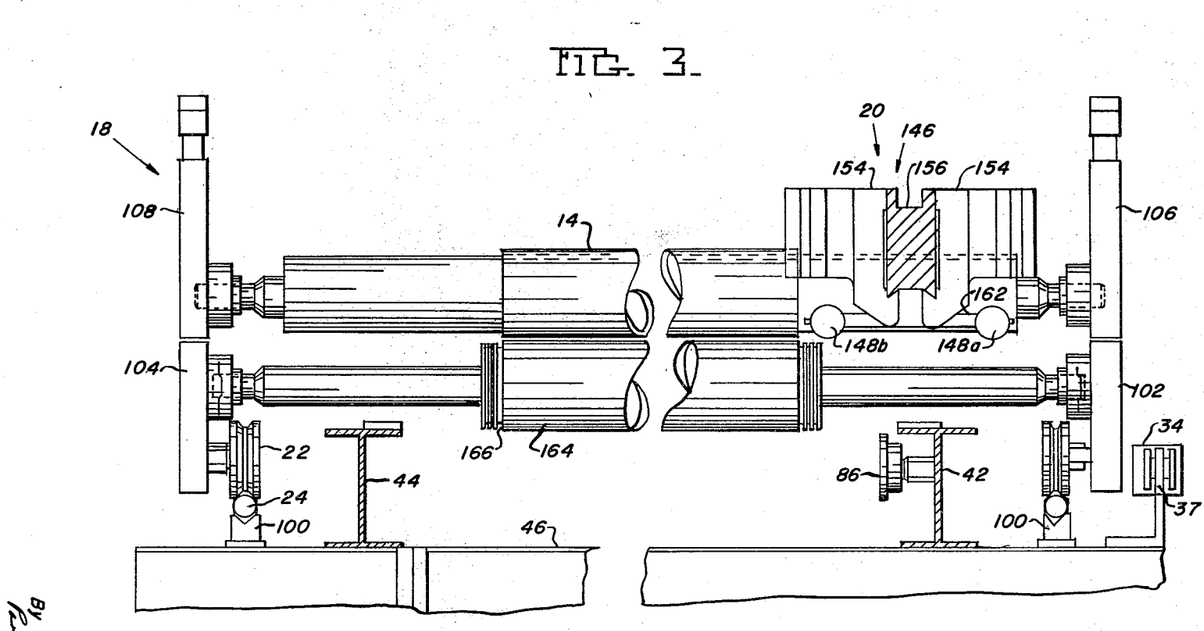
FIGURE 3 is a view on an enlarged scale taken substantially along the line III—III of FIGURE 2 less the bridge beam.
Figure 4:
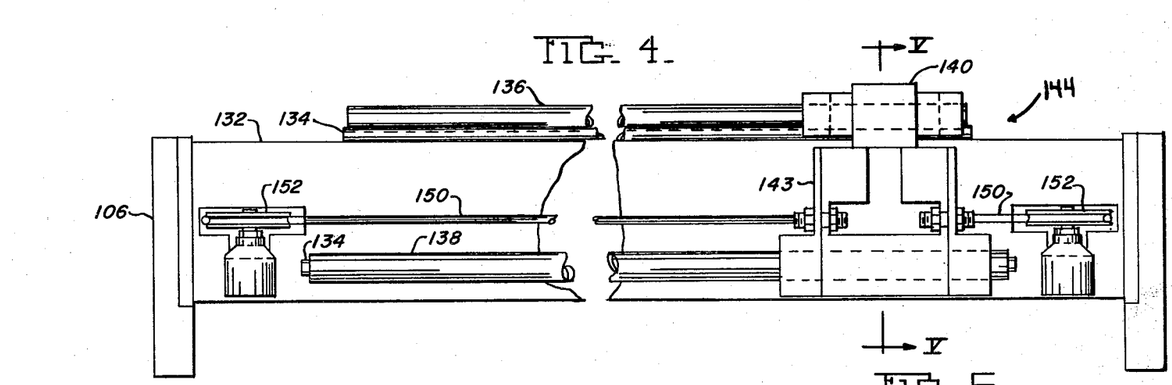
FIGURE 4 is also a view on an even larger scale taken substantially along the line III—III of FIGURE 2 less the cutting heads.
Figure 5:
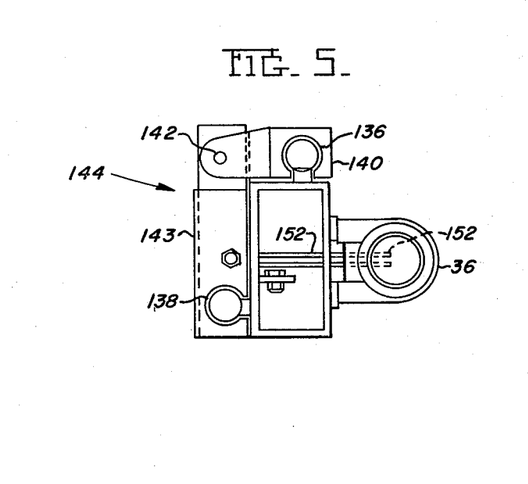
FIGURE 5 is a view taken substantially along the line V—V of FIGURE 4.

As is best seen in FIGURES 2 and 3, the horizontal, longitudinally spaced beam members 45 and 46 extend outwardly beyond the transversely spaced members 42 and 44 and support thereon a pair of beams 100. Each beam 100 has a V-shaped cross section and each forms a base for the circular rails 24 which are fastened to the beams 100.

The movable bridge assembly 18 is supported on the rails 24 and includes a lower right hand and a lower left hand bridge end 102 and 104, respectively, and an upper right hand and an upper left hand bridge end 106 and 108, respectively. The lower bridge ends 102, 104 rotatably support the lower lock-up roll 26 and its associated brake 30, and the upper bridge ends 106, 108 rotatably support the upper lock-up roll 28 and its associated brake 32. There is a transverse bridge tie rod 110 extending between the upper ends 106 and 108. A tie bar 112 extends across the tops of each upper end 106, 108 and each tie bar 112 had depending therefrom a pair of guide rods 114. Each upper end 106, 108 has a vertical opening 116 therethrough and each opening 116 has a pair of sleeve bushings 117 located therein. Each lower end 102, 104 has a vertical recess 118 therein. The guide rods 114 are positioned in the openings 116 and the recesses 118.

A pair of bridge end adjustment screws 120 pass through the tie bar 112 and are received in a pair of recesses 122 in the upper ends 106, 108. Thrust washers 124 prevent vertical movement of the screws 120 relative to the tie bars 112. A pair of bridge end adjustment nuts 126 are fixedly mounted in the upper ends 106, 108 and the screws 120 are screwed therein. The ends of a transverse worm gear shaft 128 are in mating engagement with worm wheels 130 mounted on the upper ends of each screw 120. Rotation of the worm gear shaft by means of a hand wheel (not shrown) effects rotation of the screws 120 causing nuts 126 together with the upper ends 106, 108 and all which is supported by them to move in a vertical plane and relative to the lower ends 102, 104. By reason of this construction, the gap between the upper and lower lock-up rolls may be adjusted to provide for different thickness of ribbon. Normally, the gap between the lock-up rolls is adjusted to less than the glass thickness passing therethrough. With the gap so adjusted, the lock-up rolls rotate freely as the ribbon passes between them but when arrested by the brakes, a great amount of friction is developed between the ribbon surfaces and the rubber surfaces of sleeves 131 surrounding these rolls and this friction effectively freezes the bridge to the ribbon.

As can best be seen in FIGS. 2–5, the cutter assembly 20 is supported on the bridge 18 and more specifically it is supported on the upper ends 106, 108 of bridge 18. A transverse rectangular tube or cross cut bridge having raised portions 134 thereon is mounted on the ends 106, 108. A pair of transverse shafts 136 and 138 are fixedly secured to the raised portions 134 and form guide rails which guide the cutting assembly in its travel across the bridge 18.

A horizontal block 140 pivotally connected at 142 to a vertical supporting portion 143 forms a cutting head support unit 144. A cutter head 146 having two cutting wheels or tools 148A and 148B mounted thereon is fastened to the support unit 144 for movement therewith across the bridge 18. The cable cylinder 36 is fastened to the tube 132 and includes a piston movable longitudinally thereof. The piston has fastened thereto the cable are secured to the vertical supporting portion 152 mounted on the tube 132 and the opposite ends of the acble are secured to the vertical supporting portion 143. With this arrangement, when air pressure is admitted into the left side of the cable cylinder 36, the cutting assembly will move across the cross cut bridge 132 to the left side of the bridge 18.

Figure 6:
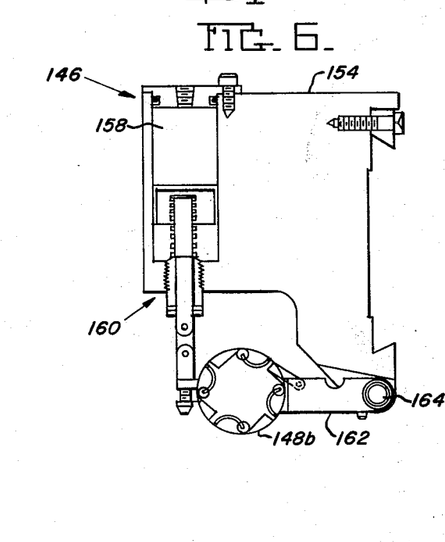
FIGURE 6 is a partial sectional view on an enlarged scale of the cutter head to illustrate details of its construction.

Now referring to FIGURE 3 and to FIGURE 6 which shows the right hand portion of the cutter head 146, the cutter head comprises a pair of supporting blocks 154 joined together by slide block 156. An air chamber 158 and a spring biased piston and rod assembly 160 are provided in each block 154. The rods of the assembly 160 are fastened to a lever 162 which is pivotally connected at 164 to the blocks 154. The cutting wheels 148 are mounted on the levers 162. By reason of this arrangement, when air pressure is admitted to the chambers 158, the cutting wheels will move into cutting relation with the glass ribbon surface, as shown, and when the chambers are exhausted to the atmosphere, the spring biasing the piston and rod will retract the cutting wheels 148.

Directly beneath the cutting wheels 148, and rotatably supported in the lower bridge ends 102, 104 is a cut roller 164 having its outer periphery tangent to the pass line. The cut roller 164 also has a rubber sleeve 166 surrounding it and this roller supports the glass ribbon at the cut thereby preventing the ribbon from flexing under cutting pressure.

Returning now to FIGS. 1 and 2, the breaker roller 38 has a rubber sleeve 167 surrounding it and this roller is rotatably mounted in a pair of tie blocks 168 which are non-rotatably secured to a snapper roller shaft 170. The snapper roller shaft 170 is in turn rotatably mounted in pillow blocks 172. The snapper roller shaft 170 is connected to pneumatic cylinder 40 through arm 174 and rod clevis 176. When air pressure is admitted to cylinder 40, arm 174 will move to the right, as viewed in FIG. 1, and rotate shaft 170 causing breaker roller 38 to move upwardly.

The various pneumatic cylinders described are all operable by supplying air pressure to them from an air supply source (not shown). The air pressure being supplied to the various cylinders is controlled through a group of solenoid valves as will be explained hereinafter in the description of FIG. 7.

The control circuitry of the cutting aparatus will now be explained by reference to FIG. 7 which will be described in conjunction with a complete cycle of automatic operation as initiated by an operator.

The various limit switches or sensing devices, designated by the prefixes LS, and the various solenoid valves, designated by the prefixes SV, shown in the wiring diagram have not been shown in FIGS. 1–6 so as not to clutter those views. However, the location of each limit switch and the function of each solenoid valve will become evident as the description proceeds.

Figure 7:
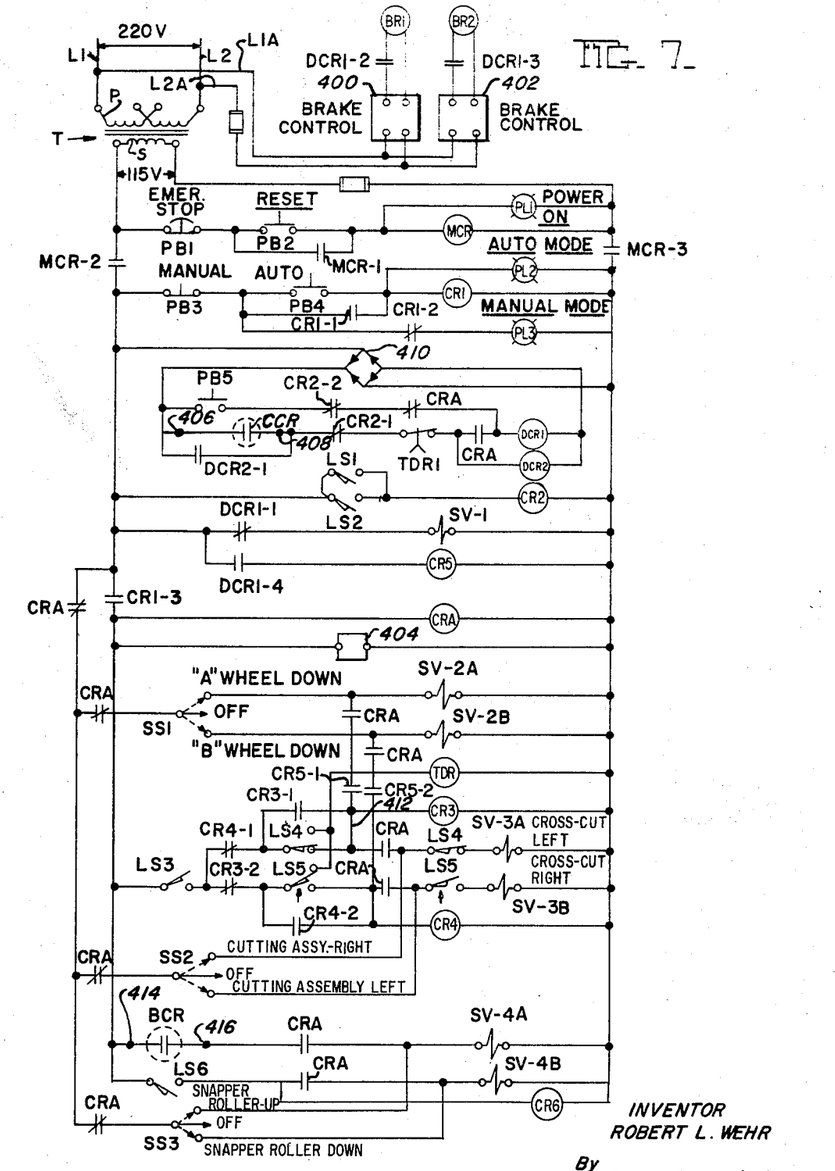
FIGURE 7 is a schematic wiring diagram of the control circuitry for the apparatus of the present invention.

All relay contacts in FIG. 7 are shown in the de-energized position unless otherwise stated. The circuitry includes a single phase control transformer T having its primary winding P connected to a 220 v. AC source by leads L1 and L2. The 220 v. AC source is also connected by leads L1A and L2A to the two brake control units 400 and 402. The two brake control units 400, 402 are standard units and have a 220 v. AC input and 90 v. DC output. The units 400, 402 are connected to the brakes 30 and 32 which are designated in FIG. 7 as BR1 and BR2. The secondary winding S has a 115 v. AC output and is included in the remaining circuitry and furnishes the power thereto.

To initiate an automatic cycle of operation, the circuit must first be conditioned. To accomplish this, the operator momentarily depresses Reset pushbutton PB2 to energize master control relay MCR which is locked in by a holding circuit through contacts MCR–1. With relay MCR energized, the contacts MCR–2 and MCR–3 will be closed. At this time, the POWER ON pilot light PL1 and the MANUAL MODE pilot light PL3 are energized and lit and the manual operating system is energized. Also at this time, the solenoid valve SV1 is energized through normally closed contacts DCR1–1.

Valve SV1 when energized applies air pressure to air cylinder 34 to hold the bridge 18 in a first or upstream position or to return the bridge to this position. The selector switch SS1 is in the OFF position and therefore solenoid valves SV2A and SV2B are not energized. The valves SV2A and SV2B when energized apply air pressure to the chambers in the cutting assembly to lower the cutting wheels into cutting relation with the ribbon. The selector switch SS2 is in the OFF position and therefore solenoid valves SV3A and SV3B are not energized. The valves SV3A and SV3B when energized apply air pressure to the cable cylinder 36 to drive the cutting assembly 20 across the bridge. To establish a reference point, it will be assumed that with switch SS2 in the OFF position the cutting assembly is located at the extreme right position adjacent to bridge end 106. The selector switch SS3 is also in the OFF position and therefore solenoid valves SV4A and SV4B are not energized. Valves SV4A and SV4B when energized apply air pressure to cylinder 40 to raise or lower the snapper roller 38. Accordingly, with each of selector switches SS1, SS2 and SS3 in the OFF position, the bridge 18 will be in its home position, the cutting wheels 148A and 148B retracted, the cutting assembly 20 located in its right hand position and the snapper roller located in the down position. Further, the brakes BR1 and BR2 have not yet been energized.

To continue with the sequence by which an operator conditions the circuit for automatic operation, he now depresses AUTO pushbutton PB4 to energize relay CR1 which is locked in by a holding circuit through normally open contacts CR1–1. With relay CR1 energized, the AUTO MODE pilot light PL2 is lit and normally closed CR1–2 contacts are open de-energizing MANUAL MODE pilot light PL3. Also, normally open contacts CR1–3 are closed energizing relay CRA which conditions the circuit for automatic control. At this time, all CR1 and CRA contacts will remain in the opposite positions from those shown. That is, normally open contacts will be closed and normally closed contacts will be open.

If at this time the operator wishes to return to the manual mode of operation, he would depress the MANUAL pushbutton PB3. By depressing PB3, relay CR1 becomes de-energized and the system will switch back to manual control and the operator could effect manual operation of the apparatus through the use of the selector switches. Also, in the event of an emergency, the operator may depress EMERGENCY STOP pushbutton PB1 which will de-energize relay MCR and the entire system will stop.

Energization of relay CR1 also supplies 115 v. AC to shear and breaker sequence counters both of which are represented in the schematic by block 404. The type of shear and breaker sequence counters used and their mode of operation will appear hereinafter as the description proceeds.

When the leading edge 16 of the ribbon contacts the upper pinch roll 64, which also serves as a count roll, the roll is rotated by the ribbon passing thereunder. This roll 64 has a rotary counting head attached to its end as is shown at 178 in FIG. 2. The counting head is of the type that will generate pulses indicative of lengths of ribbon moving past the roll 64. For example, the counting head 178 may be adjusted to generate one pulse per 0.005 inch when using a 12-inch circumference count roll. The position or location of the count roll and the rotary counting head constitutes a measuring station and as the counting head measures the ribbon of glass as it moves therepast, it sends a signal back to the shear sequence counter. The shear sequence counter counts out a pre-set distance representing a predetermined length of ribbon. When the shear sequence counter reaches coincidence with a pre-set distance, three simultaneous outputs are given.

Firstly, the shear sequence counter resets and continues to measure the ribbon for the next length of ribbon to be cut. Second, an output signal is given to trigger the breaker roller sequence counter which is also fed pulses from the counting head 178. After a predetermined number of pulses is received by the breaker roller sequence counter the breaker roller 38 raises at the scored section of glass as will be more fully explained below. Third, an output signal is given to momentarily close contacts CCR, which contacts are located within the shear sequence counter and are shown in the schematic between points 406 and 408.

When contacts CCR close, the relays DCR1 and DCR2 are energized by power from 24 v. DC power supply 410 through normally closed contacts CR2–1, normally closed time delay relay contacts TDR1 and now closed contacts CRA. At this time, normally open contacts DCR1–2 and DCR1–3 close and energize brakes BR1 and BR2. Also at this time, normally closed contacts DCR1–1 open and de-energize solenoid valve SV1 allowing cylinder 34 to exhaust to the atmosphere releasing bridge 18, and normally open contacts DCR1–4 close and energize cutting head safety relay CR5. The normally open contacts DCR2–1 close and seal in the lockup circuit around contacts CCR and the bridge 18 is now locked onto the glass ribbon and free to travel with the ribbon away from its home position or cutting station.

As the bridge 18 leaves its home position, limit switch LS3 closes. When LS3 closes the solenoid valves SV2A and SV3A and relay CR3 are energized. Valve SV2A is energized through normally closed contacts CR4–1, normally closed limit switch LS4 which is located on the bridge 18 adjacent to the bridge end 102, now closed contacts CR5–1 and now closed contacts CRA. Energization of valve SV2A applies air pressure to the cutting head and lowers the cutting wheel 148B to its cut position. When LS3 closes TDR will momentarily be energized through the contacts of LS5 which are held open by the cutter in its right hand position. The time delay, however, will prevent the contacts TDR1 from opening to release the brake circuit and is such that the cutter assembly has time to begin its movement to the left to release LS5 thereby de-energizing the TDR before the brake circuit can be de-energized. TDR functions in like manner when the cutter is at the left side and commences a right-hand cut.

Valve SV3A is energized through normally closed contacts CR4–1, limit switch LS4 and now closed contacts CRA. Energization of valve SV3A applies air pressure to the left side of the cable cylinder 36 and drives the cutting assembly 20 across the bridge 18 to the left.

Relay CR3 is energized through normally closen contacts CR4–1, normally closed limit switch LS4 and cross lead 412. Energization of CR3 seals in the cross cut left circuit around limit switch LS4 through now closed contacts CR3–1 and cross lead 412, and it also opens the cross cut right circuit by opening normally closed contacts CR3–2.

At this time, the cutting assembly is in motion and effecting cutting of the ribbon. As the cutting assembly leaves the right hand end 106, limit switch LS5 is released and closes.

When the cut is complete and the cutting head clears the glass, limit switch LS4 is actuated by the cutting assembly. The limit switch LS4 opens the circuit to valve SV3A and stops the cutting assembly by locking air in the cable cylinder 36. Also actuation of limit switch LS4 energizes time delay relay TDR whose normally closed contacts TDR1 are delayed in their opening. At the end of a predetermined time cycle switch TDR1 opens and de-energizes relays DCR1 and DCR2 causing all DCR1 and DCR2 contacts to then revert back to their normal positions. The time cycle or interval in which TDR1 is delayed in its opening is to insure that the cutting tool is completely clear of the glass before the brakes are released allowing the glass to advance relative to the bridge. When relay DCR1 is de-energized, relay CR5 is de-energized which de-energizes the circuit to SV2A to retract the cutting tool 148B by discharging the air pressure in the chamber 158 to the atmosphere. The contacts DCR–2 and DCR–3 now being open release the brakes BR1 and BR2 and the contacts DCR1–1 again being closed energizes valve SV1 which applies air pressure to the bridge return cylinder 34 returning it to its home position.

If for any reason the time delay relay TDR had failed, the bridge 18 would have continued down stream and actuated over travel limit switches LS1 and/or LS2. The limit switches LS1 and LS2, when closed, energize relay CR2 and open the circuit to relays DCR1 and DCR2 by opening normally closed contacts CR2–1 and CR2–2. This also will energize the bridge return solenoid valve SV1.

When the bridge returns to its home or first position limit switch LS3 is actuated, that is, it is opened again and this de-energizes relay CR3 whose contacts revert back to their normal positions and TDR1 switch transfers to its normally closed position. With the limit switches LS3 and LS4 now being held open by the bridge 18 and the cutting assembly 20, respectively, and the normally closed limit switch LS5 having been released when the cutting assembly moved across the bridge from its right hand position, the circuit is now set-up for the cutting assembly to move back to its initial or right hand position to complete a cutting cycle in the opposite direction from that just described. The operation of the circuit during the cutting stroke in the opposite direction, that is, with the cutting assembly starting from the left side of the bridge, follows automatically as the shear sequence counter had reset itself to begins a new count prior to initiating the cutting stroke just described.

As stated above, when the shear sequence counter reached coincidence with a pre-set distance, an output signal was given to trigger the breaker roller sequence counter. This latter counter is preset to count out a preset distance and actuate the breaker roller after the cut or score line has traveled downstream the proper distance. This proper distance or measurement is constant. It is predetermined by the preselected relative positions of both the bridge in its home position and of the breaker roller. Therefore, when the breaker sequence counter reaches coincidence with a constant preset distance, an output signal is given to momentarily close contacts BCR, which contacts are located within the breaker sequence counter and are shown in the schematic between points 414 and 416. Closure of contacts BCR will energize valve SV4A to apply air pressure to cylinder 40 which suddenly and almost imperceptibly moves the breaker roller up snapping the glass along the score line. When the breaker roller reaches a predetermined uppermost position limit switch LS6 is actuated and closes. The closing of limit switch LS6 energizes valve SV4B and relay CR6. When valve SV4B is energized, it exhausts the up stroke and pressurizes the down stroke of the breaker cylinder 40. Energization of relay CR6 effects acceleration of the adjoining conveyor represented by roller 41 which moves the cut section away from the ribbon. With the valve SV4B energized, the breaker roller returns to its down position opening limit switch LS6 and deenergizing SV4B and relay CR6 thus completing a full automatic cycle of operation.

The shear sequence counter and its related circuitry form the glass length measuring system and the breaker sequence counter and its related circuitry form the breakout measuring system.

Both the shear sequence counter and the breaker sequence counter are preset or programmed to perform the above described functions. Additionally, the shear sequence counter can have two sets of presets with one group of presets being set for a second predetermined length. When such a shear sequence counter is utilized with a preset batch counter set to count a predetermined number of first predetermined lengths, cutting of such lengths will continue until the preset number on the batch counter is satisfied. When coincidence on the batch counter is reached, control is immediately transferred to the second group of presets in the shear sequence counter and whatever length is programmed in these presets will now control the lengths of sheet cut. The shear sequence counter preferably is of the latter type as sold by The Louis Allis Company under the name DYnapar Digital Add-Subtract Length Controller, Type 226DSP. The breaker sequence counter is preferably a DYnapar Digital Add-Subtract Length Controller, Type 214DSP as sold by this same company.

While I have shown one embodiment of the invention, it will be obvious to those skilled in the art that variations and modifications in the particular construction and arrangement of parts can be made within the scope and spirit of the invention and under the scope of the following claims.

I claim:

1. Apparatus for cutting an advancing ribbon of material into predetermined lengths comprising
    (a) a measuring station including measuring means past which the ribbon advances for continuously measuring the ribbon moving therepast and for generating a signal indicative of a predetermined length of ribbon having advanced therepast, and
    (b) a cutting station located downstream of the measuring station and including
        (1) a bridge assembly movable with the advancing ribbon between a first position and a second position downstream of the first position,
        (2) first means mounted on the bridge assembly and operative to engage the advancing ribbon in response to a signal from the measuring means whereby the bridge assembly is moved by the ribbon from its first position to its second position,
        (3) a cutting assembly including a cutting tool mounted on the bridge assembly,
        (4) second means supported on the cutting assembly and operative to move the cutting tool into and out of cutting relation with the ribbon,
        (5) third means mounted on the bridge assembly and operative to move the cutting assembly transversely of the direction of travel of the ribbon when the bridge assembly is advancing from the first to the second position and when the cutting tool is in cutting relation with the ribbon, whereby to constitute a cutting stroke, and
        (6) first sensing means arranged to sense the movement of the bridge assembly away from its first position for actuating the second and third means to effect a cutting stroke.

2. The combination defined in claim 1 wherein the third means is operative to move the cutting assembly between a first and a second position on opposite sides of the bridge assembly, and return means connected to the bridge assembly and operative to return the bridge asssembly to its first position, and second sensing means operative when the cutting assembly is in its second position to terminate the cutting stroke and actuate the return means.

3. The combination defined in claim 1 wherein the third means is operative to move the cutting assembly between a first and a second position on opposite sides of the bridge assembly, including return means connected to the bridge assembly and operative to return the bridge assembly to its first position, and second sensing means including time delay means operative when the cutting assembly is in its second position to sequentially deactuate the third means and after a predetermined interval disengage the first means, deactuate the second means and actuate the return means.

4. Apparatus for cutting an advancing ribbon of glass into predetermined lengths comprising
    (a) a measuring station including measuring means past which the ribbon advances for continuously measuring the ribbon moving therepast and for generating a signal indicative of a predetermined length of ribbon having advanced therepast, and
    (b) a cutting station located downstream of the measuring station and including
        (1) a bridge assembly movable with the advancing ribbon between a first position and a second position downstream of the first position,
        (2) first means mounted on the bridge assembly and operative to engage the advancing ribbon in response to a signal from the measuring means whereby the bridge assembly is moved by the ribbon from its first position to its second position,
        (3) a cutting assembly including a glass scoring tool mounted on the bridge assembly,
        (4) second means supported on the cutting assembly and operative to move the tool into and out of scoring relation with the ribbon,
        (5) third means mounted on the bridge assembly and operative to move the cutting assembly transversely of the direction of travel of the ribbon when the bridge assembly is advancing from the first to the second position and when the tool is in scoring relation with the ribbon, whereby to constitute a scoring stroke, and
        (6) first sensing means arranged to sense the movement of the bridge assembly away from its first position for actuating the second and third means to effect a scoring stroke.

5. The combination defined in claim 4 including glass breaking means positioned downstream of the cutting station for providing a breaking force to the ribbon when the score line is positioned thereover, and actuating means connected to the breaking means and operative to effect an upward movement in the glass breaking means in response to a second signal from the measuring means whereby the predetermined length of ribbon is broken along the score line and separated from the ribbon.

6. The combination defined in claim 4 including a cut roller rotatably mounted on the bridge and positioned beneath the scoring tool with its outer periphery being in rolling contact with the undersurface of the ribbon such that the cut roller provides support to the ribbon under the scoring tool during a scoring stroke.

7. The combination defined in claim 6 wherein the first means comprises a pair of spaced rolls, the rolls being rotatably supported on the bridge assembly such that one roll is in rolling contact with the upper surface of the ribbon and the other is in rolling contact with the lower surface of the ribbon, and braking means connected to the rolls operative in response to a signal from the measuring means to arrest rotation of the rolls whereby the friction developed between the glass ribbon surfaces and the surfaces of the rolls effects frictional engagement of the bridge assembly with the ribbon which ribbon then moves the bridge assembly from its first position to its second position.

8. The combination defined in claim 6 including biasing means connected to the bridge assembly and operative to provide a downstream biasing force on the bridge assembly.

9. Apparatus for cutting a moving sheet of material or moving continuous ribbon of material into predetermined lengths comprising:
    (a) a cutting assembly,
    (b) a movable support means for movably supporting the cutting assembly,
    (c) first means on the support means operative to effect synchronized parallel movement of the support means with the material to be cut comprising a pair of confronting rolls rotatably mounted on the movable support means and between which the material travels with the rolls in rolling contact with the material, and brake means operatively connected to the rolls to effect non-rolling frictional contact of rolls with the material,
(d) second means on the support means to move the cutting assembly transversely of the path of travel of the material to be cut, and
(e) means for detecting a predetermined length of material and initiating the operation of the first and second means.

10. An apparatus for glass cutting which comprises:
(a) conveyor means to move a continuous ribbon of glass in a rectilinear path,
(b) a glass scoring tool,
(c) a movable bridge spanning the ribbon and movably supporting the tool,
(d) first means on the bridge to effect movement of the bridge in a rectilinear path parallel to the path of movement of the ribbon of glass comprising a pair of spaced rolls, the rolls being rotatably supported by the bridge such that one roll is in rolling contact with the upper surface of the ribbon and the other is in rolling contact with the lower surface of the ribbon, and braking means operatively connected to the rolls to arrest rotation thereof, the arrangement being such that the rolls rotate freely as the ribbon of glass passes between them but when arrested by the braking means, the friction developed between the glass ribbon surfaces and the surfaces of the rolls effects frictional engagement of the bridge with the ribbon which ribbon then moves the bridge with it along its path of movement,
(e) second means on the bridge to move the tool transversely of the path of movement of the ribbon, and
(f) means for initiating the operation of the first and second means.

References Cited
UNITED STATES PATENTS

| | | | |
|---|---|---|---|
| 2,287,833 | 6/1942 | Ridgway | 83—294 X |
| 2,834,156 | 5/1958 | Oberlin | 225—96.5 |
| 3,040,609 | 6/1962 | Bowman | 83—294 X |
| 3,107,834 | 10/1963 | Hoffman et al. | 225—96.5 |
| 3,164,046 | 1/1965 | Arnaud | 83—319 X |
| 3,198,044 | 8/1965 | Olin | 83—10 |

JAMES M. MEISTER, Primary Examiner

U.S. Cl. X.R.

83—12, 294, 319